United States Patent
Mehnert et al.

(10) Patent No.: US 11,087,470 B2
(45) Date of Patent: Aug. 10, 2021

(54) IMAGE ANALYSIS INCLUDING TARGETED PREPROCESSING

(71) Applicant: Robert Bosch GmbH, Stuttgart (DE)

(72) Inventors: Jens Eric Markus Mehnert, Malmsheim (DE); Stefan Bischoff, Leonberg (DE); Stephan Lenor, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 68 days.

(21) Appl. No.: 16/628,320

(22) PCT Filed: Jun. 11, 2018

(86) PCT No.: PCT/EP2018/065289
§ 371 (c)(1),
(2) Date: Jan. 3, 2020

(87) PCT Pub. No.: WO2019/007632
PCT Pub. Date: Jan. 10, 2019

(65) Prior Publication Data
US 2020/0160530 A1    May 21, 2020

(30) Foreign Application Priority Data
Jul. 4, 2017    (DE) .......................... 102017211331.6

(51) Int. Cl.
*G06K 9/62* (2006.01)
*G06T 7/13* (2017.01)
(Continued)

(52) U.S. Cl.
CPC .............. *G06T 7/13* (2017.01); *G05D 1/0088* (2013.01); *G06K 9/00791* (2013.01);
(Continued)

(58) Field of Classification Search
CPC .... G05D 1/0088; G06K 9/00791; G06K 9/40; G06K 9/4628; G06K 9/6259;
(Continued)

(56) References Cited

U.S. PATENT DOCUMENTS 5,182,776 A    1/1993  Suzuki et al.
5,553,159 A    9/1996  Takeo
(Continued)

FOREIGN PATENT DOCUMENTS

| DE | 10319176 A1 | 11/2004 |
|---|---|---|
| DE | 102006062061 A1 | 7/2008 |
| WO | 2016145379 A1 | 9/2016 |

OTHER PUBLICATIONS

International Search Report dated Nov. 30, 2018 of the corresponding International Application PCT/EP2018/065289 filed Jun. 11, 2018.
(Continued)

*Primary Examiner* — Xin Jia
(74) *Attorney, Agent, or Firm* — Norton Rose Fulbright US LLP; Gerard Messina

(57) ABSTRACT

A system includes a K1 preprocessing module designed to generate at least one intermediate image from an input image using a parameterized internal processing chain and an analysis module to detect a feature or object in the intermediate image. A method to train the system includes feeding a plurality of learning input images to the system, comparing a result provided by the analysis module for each of the learning input images to a learning value, and feeding back a deviation obtained by the comparison to an input preprocessing module and/or adapting parameters of the internal processing chain to reduce the deviation.

14 Claims, 3 Drawing Sheets

(51) Int. Cl.
*G05D 1/00* (2006.01)
*G06K 9/00* (2006.01)
*G06N 3/04* (2006.01)

(52) U.S. Cl.
CPC .. *G06N 3/0454* (2013.01); *G06T 2207/20081* (2013.01); *G06T 2207/20084* (2013.01); *G06T 2207/30168* (2013.01)

(58) Field of Classification Search
CPC .................. G06N 3/0454; G06N 3/084; G06T 2207/20081; G06T 2207/20084; G06T 2207/30168; G06T 2207/30248; G06T 5/001; G06T 7/13
See application file for complete search history.

(56) References Cited

U.S. PATENT DOCUMENTS

| | | | |
|---|---|---|---|
| 9,760,806 B1* | 9/2017 | Ning | G06N 3/0454 |
| 2014/0153781 A1* | 6/2014 | Suh | G06T 7/13 |
| | | | 382/103 |
| 2017/0206434 A1* | 7/2017 | Nariyambut Murali | G06K 9/4642 |
| 2017/0345196 A1* | 11/2017 | Tanaka | G06T 5/50 |
| 2018/0074493 A1* | 3/2018 | Prokhorov | G05D 1/0274 |
| 2020/0242734 A1* | 7/2020 | Wang | G06K 9/6289 |

OTHER PUBLICATIONS

Alex Krizhevsky et al "ImageNet classification with deep convolutional neural networks," The 26th annual conference on Neural Information Processing Systems (NIPS'25): Dec. 3-8, 2012, Dec. 6, 2012.

Jeff Donahue et al "DeCAF: A Deep Convolutional Activation Feature for Generic Visual Recognition," Oct. 5, 2013.

Mohamed A. El-Sayed et al., "Automated Edge Detection Using Convolutional Neural Network," International Journal of Advanced Computer Science and Applications, vol. 4, No. 10, 2013, pp. 11-17.

Gurghian Alexandru et al. "DeepLanes: End-to-End Lane Position Estimation Using Deep Neural Networks," 2016 IEEE Conference on Computer Vision and Pattern Recognition Workshops (CVPRW), IEEE, Jun. 26, 2016, pp. 38-45.

Zhu Zhe et al, "Traffic-Sign Detection and Classification in the Wild," 2016 IEEE, Jun. 27, 2016, pp. 2110-2118.

Wu Yihui et al., "Traffic sign detection based on convolutional neural networks," The 2013 International Joint Conference on Neural Networks (IJCNN), IEEE, Aug. 4, 2013, pp. 1-7.

* cited by examiner

IMAGE ANALYSIS INCLUDING TARGETED PREPROCESSING

CROSS-REFERENCE TO RELATED APPLICATIONS

The present application is the national stage of International Pat. App. No. PCT/EP2018/065289 filed Jun. 11, 2018, and claims priority under 35 U.S.C. § 119 to DE 10 2017 211 331.6, filed in the Federal Republic of Germany on Jul. 4, 2017, the content of each of which are incorporated herein by reference in their entireties.

FIELD OF THE INVENTION

The present invention relates to an image analysis system that can be used in particular for detecting edges, objects, and other features in driver assistance and autonomous driving systems.

BACKGROUND

Actively participating in motorized road traffic requires recording visual information. Accordingly, camera systems for driver assistance and autonomous driving systems are an important source of information.

Prior to the analysis, the image provided by a camera must generally be preprocessed, for example, by rectification or color adaptation. However, such a preprocessing tends to involve a significant compression of the information contained in the image. For that reason, a preprocessing that is not suited for the intended analysis can cause the information that is actually required for this analysis to be rejected. Instead of improving the result of the analysis, as intended, it can degrade the same.

U.S. Pat. No. 5,182,776 describes an image analysis process including image preprocessing using a self-learning, artificial neural network to measure the number of passengers waiting for an elevator. Supplementary information is used to check the plausibility of the measured number, and deviations are propagated back to the neural network as learning information, where they also influence the preprocessing parameters.

U.S. Pat. No. 5,553,159 describes using an artificial neural network when recording X-ray images. The artificial neural network is also able to optimally adjust the parameters for the physical recording of the raw image and for the subsequent preprocessing.

SUMMARY

According to an example embodiment of the present invention, a system for detecting features or objects in an input image includes at least one preprocessing module in the form of a K1 module that is designed to generate at least one intermediate image from the input image using a parameterized internal processing chain. The system also includes at least one analysis module that is designed to detect the desired feature or object in the intermediate image.

It was realized that this division of functionality makes it possible to optimize the preprocessing independently of the actual analysis. If, for example, the analysis module is likewise in the form of a K1 module and both K1 modules are self-learning, the learning processes of the two K1 modules can be decoupled from each other. Thus, for example, the preprocessing module and the analysis module can be replaced independently of each other without any sudden loss of learning progress of the K1 at an unexpected point.

At the same time, however, the requirements of the desired analysis can already be considered during the preprocessing, so that, in the case of unavoidable reduction and compression of the information during the preprocessing, it is possible that exactly that information is selected which is also relevant for the intended analysis. Thus, the full amount of information of the input image is still available for the relevant learning process, in particular. Up until now, prior art approaches, especially in the field of driver assistance systems and autonomous driving, have provided that the input image be initially processed using a rigid preprocessing including rectification and color processing, for example. In accordance therewith, a segmentation into features followed, and thus a further reduction in the amount of information before the actual analysis began. Also, a K1 was used.

Furthermore, the mentioned modular design is particularly advantageous for driver assistance systems and autonomous driving. In such complex systems, a multiplicity of properties is to be analyzed from one and the same input image. Thus, in an especially advantageous example embodiment of the present invention, a plurality of analysis modules can be provided, where the intermediate images that the analysis modules receive, and/or the features or objects for whose detection the analysis modules are designed in each case, differ from one another. The preprocessing module is able to translate one and the same input image into intermediate images having different contents and objectives, for instance, intermediate images having:
  color information,
  proper motion information,
  enhanced quality with regard to a particular aspect, or
  different input image segments (scene segmentation).

One and the same preprocessed intermediate image is not necessarily optimal for all planned analyses. Thus, for example, different requirements apply to images for displaying systems and human viewers ("display vision") than to images for which machine analysis is planned using subsequent measurement programs and functions ("machine vision"). For example, a blurred, or in some other way smoothed, intermediate image can improve an object detection in a noisy image, while, on the contrary, edge detection is more likely to benefit from the sharpening of the intermediate image. The modular design makes it possible for an intermediate image to be provided that is optimized for each planned analysis.

These various intermediate images can then be advantageously generated in parallel, particularly when the input image passes through one and the same internal processing chain in the preprocessing module during generation of intermediate images for a plurality of analysis modules. In such situations, the preprocessing module does not perform substantially identical work numerous times in succession. In particular, in existing driver assistance and autonomous driving systems, it is often the case that various analysis algorithms require image information in different quantities and color formats. It is very time-consuming to produce a plurality of intermediate images in succession for this purpose.

The preprocessing module can be designed to be self-learning. For this purpose, an especially advantageous example embodiment of the present invention provides at least one assessment module that is designed to qualitatively assess the result provided by the analysis module and feed it back to an input of the preprocessing module. For this, the analysis module, for example, can provide an objective function for the qualitative assessment.

On the other hand, the preprocessing module does not necessarily need to be self-learning. The preprocessing module can have been trained at the factory using a multitude of learning data, for example, so that the parameters that define the internal processing chain already include the learning experience from this training. For example, the preprocessing module can then be operated statically, i.e., can be able to retrieve the learning experience when generating intermediate images from input images without further increasing them.

If a plurality of analysis modules are present, an assessment module specific thereto can be assigned to each analysis module, for example, and can also be integrated in the analysis module itself. A common assessment module can also be provided, for example. In a particularly advantageous example embodiment of the present invention, the assessment module is designed to combine the assessment of the results provided by a plurality of analysis modules into an overall assessment and feed it back to an input of the preprocessing module. It is then possible, for example, to provide one and the same intermediate image to a plurality of analysis modules. This represents an optimal compromise among the particular requirements.

However, this type of overall assessment can also indicate that there are two different analysis modules that receive different intermediate images. For example, if the input image is to be analyzed in a first analysis module having categorical cross entropy and, in a second analysis module, having binary cross entropy, then the optimal intermediate image can correspond to an extreme value of a first objective function $Z_1$ relative to the first analysis module and to an extreme value of a second objective function $Z_2$ relative to the second analysis module. If, at this point, for example, in an especially advantageous example embodiment of the present invention, the input image passes through one and the same internal processing chain during generation of intermediate images, then the optimization of this internal processing chain automatically affects the other as well with regard to the one intermediate image. An optimal compromise between the optimizations for both analysis modules can be found using a common target function Z, in which both target functions $Z_1$ and $Z_2$ are weighted in accordance with the specification $Z=\lambda+Z_1+Z_2$, for example.

The required functionalities are advantageously distributed among the analysis modules in a way that makes it possible to optimize an intermediate image for the requirements of each analysis module without a conflict of objectives occurring among the various functionalities implemented therein. As previously explained, such a conflict of objectives exists, for example, between object detection and edge detection. For that reason, in an especially advantageous example embodiment of the present invention, at least one analysis module is designed to detect at least one object, while at least one other analysis module is designed to detect at least one edge.

In an especially advantageous example embodiment of the present invention, the internal processing chain of the preprocessing module includes at least one artificial neural network composed of a plurality of layers of artificial neurons. In this network, an input layer records the input image, and an intermediate image layer stores the intermediate image. At least two processing layers are disposed between the input layer and the intermediate image layer. The parameters of the processing chain include weights of the connections between layers of the neural network.

It was recognized that such a neural network can be very effectively parallelized. Thus, computing capacity can be realized at low specific costs per unit. In particular, it is advantageous that the hardware complexity of the system be concentrated in the neural network. The overall costs of the system can be appreciably reduced as the remaining components of the system can then be significantly scaled down.

At least one processing layer is advantageously adapted for convolving image data using a convolution kernel, and/or for compressing the image data by downsampling. These are functions whose computational complexity is able to be very effectively parallelized in a neural network.

In an especially advantageous example embodiment of the present invention, on the side facing away from the input layer, the neural network has at least one analysis layer within which at least a part of the functionality of the analysis module is implemented. In this manner, for example, the most computationally intensive portion of the analysis can be performed on the powerful, parallelized hardware of the preprocessing module. The overall hardware complexity of the system can then be concentrated even more in the preprocessing module.

A camera for obtaining the input image is advantageously additionally provided in the system. In an especially advantageous example embodiment of the present invention, this camera is adapted to be cooled by the windshield of a vehicle, the camera having an electric power consumption of maximally five watts. The camera can then be integrated in the windshield or situated directly behind the same, to record the events in front of the vehicle from a perspective that is as similar as possible to that of a human driver of the vehicle. Restriction of the power to five watts is due to a substantially higher power not being able to be dissipated via the windshield under all climatic conditions, potentially causing the camera to overheat. Generally, the camera contains semiconductor components whose service life decreases exponentially with the operating temperature.

In an advantageous example embodiment of the present invention, the preprocessing module is additionally adapted for ascertaining at least one controlled variable that is fed to the camera for at least one operating parameter thereof. In principle, a preprocessing is only able to extract information from the input image that is adequately manifested therein. The operating parameters of the camera itself provide an additional degree of freedom to bring out certain aspects to the detriment of others. Thus, based on the light exposure setting, it can be established, for example, that only image regions, whose brightness is within a certain interval, actually fall within the dynamic range of the camera between the minimum and maximum intensity. For example, it is precisely by a relatively long exposure time (what is generally referred to as blurring) that many features are able to be brought out. This is initially counterintuitive, since a great deal of other information is hereby considerably smoothed out in the image. However, the camera can also be switched to a different wavelength range, for example.

In an especially advantageous example embodiment of the present invention, the system is coupled to a steering system, a braking system, and/or a drive system of an at least partially automated vehicle. At least one detection of a feature or object is thereby converted to a control signal that acts on the steering system, the braking system, and/or the drive system. The control signal can specify a steering angle, a torque of the drive system, or a braking deceleration, for example. In this manner, the system is able to qualitatively improve the at least partially automated managing of the driving task, especially with regard to reliability and operational safety.

An example embodiment of the present invention is directed to a method for training the described system. In this method, a plurality of learning input images are fed to the system. The result provided by the analysis module for each learning input image is then compared to a known learning value for the result that is associated with the learning input image. A deviation of the result from the learning value can then be subsequently further used in two ways, individually or in combination. On the one hand, the deviation can be fed back to an input of the preprocessing module, to enable the K1 contained therein to automatically successively configure the parameters of the internal processing chain thereof in a way that allows the learning input images to be translated as effectively as possible into the corresponding results. On the other hand, an optimization algorithm can be used, for example, to directly intervene in the parameters of the internal processing chain of the preprocessing module. Besides the freedom in selecting the optimization algorithm, the latter also makes it possible to draw upon an external computing capacity for the training that is considerably greater than that which is physically present in the ready-made preprocessing module.

Many objective functions provide scalar values, and the optimum corresponds to an extreme value. A gradient descent method is advantageously used to adapt the parameters.

The system can include special hardware for the preprocessing module, for example, hardware that is specially conceived as a platform for artificial neural networks. However, for the basic operating principle in accordance with the present invention, it is not a question of the specific platform on which the system is implemented. This platform can also be a computer or a control unit for installation in a vehicle, for example. The functionality in accordance with the present invention can then be embodied in a suitable software that, in this respect, is a product that is separately available. For that reason, the present invention also relates to a computer program product having machine-readable instructions that, when executed on a computer and/or on a control unit, upgrade the computer, respectively the control unit to a system according to the present invention, and/or prompt the same to execute a method in accordance with the present invention.

With reference to the figures, other refinements of the present invention are explained in greater detail in the following, along with the description of preferred example embodiments of the present invention.

DETAILED DESCRIPTION

Figure 1:
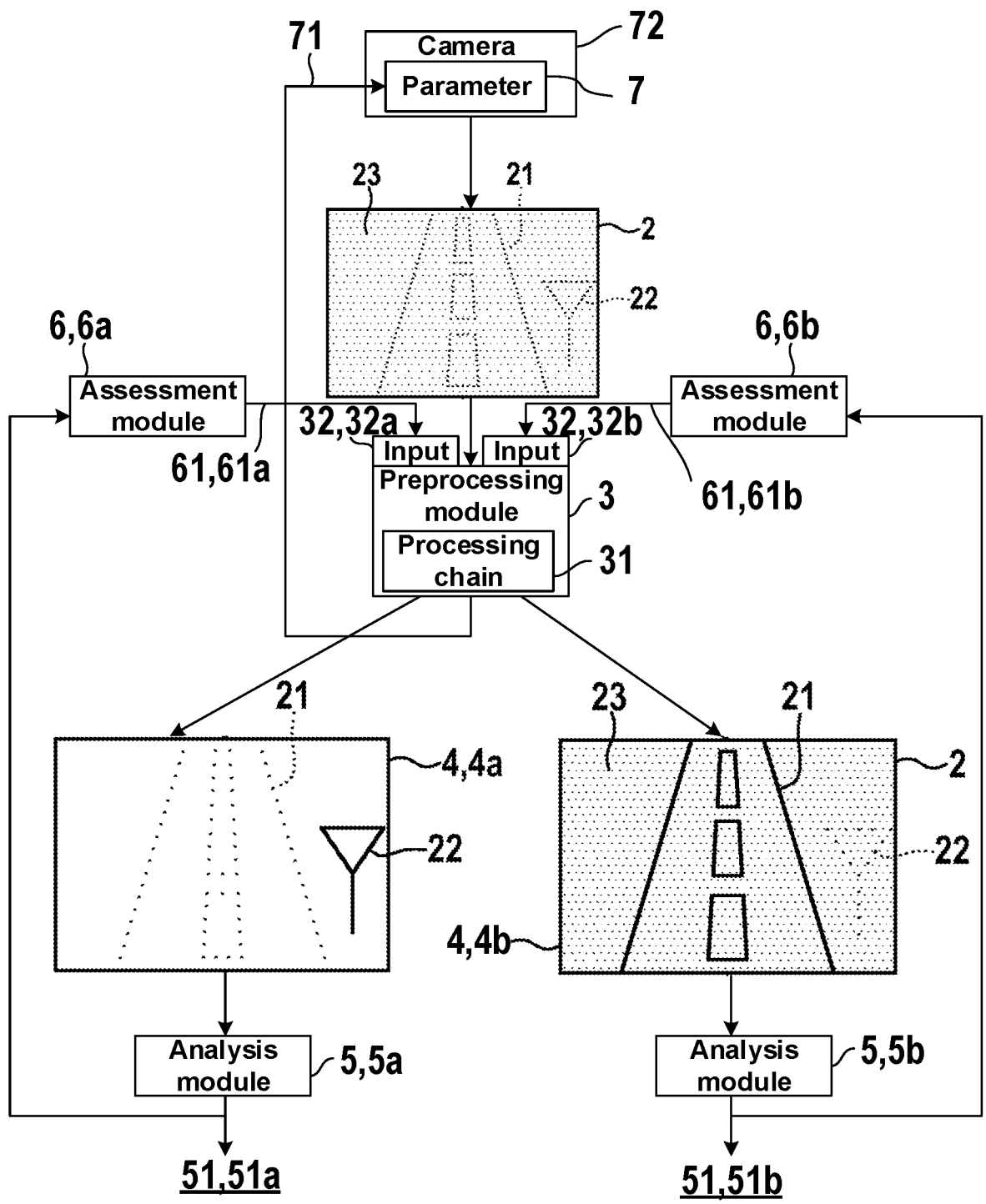
FIG. 1 shows an example embodiment of a system according to an example embodiment of the present invention.

System 1, drawn exemplarily in FIG. 1, is provided for acquiring information during control of an autonomous vehicle (not shown in further detail) in FIG. 1. A camera 7 mounted on the windshield of the vehicle records an input image 2. Here, input image 2 exemplarily contains an edge 21 that corresponds to the edge of the road, and a traffic sign 22. To manage the driving task, both edge 21 as well as traffic sign 22 are detected, for example. This is initially difficult in input image 2, since edge 21 and traffic sign 22 are only faintly discernible, and noise 23 is additionally superimposed on input image 2.

System 1 includes a first analysis module 5a that is designed for detecting 51a traffic sign 22, as well as a second analysis module 5b that is designed for detecting 51b edge 21. For both collectors 5a and 5b, preprocessing module 3 provides a respective intermediate image 4a or 4b tailored to the specific requirements thereof.

First intermediate image 4a is blurred. This frees it from noise 23 contained in input image 2, and traffic sign 22 is more clearly outlined. The consequence, however, is that edge 21 is blurred even more in comparison to input image 2. First analysis module 5a is not able to be affected by the same and provides an effective detection 51a of traffic sign 22.

Second intermediate image 4b is sharp. Noise 23 has been thereby somewhat intensified in comparison to input image 2, so that traffic sign 22 is even more difficult to discern. For this purpose, edge 21 is more clearly defined, so that second analysis module 5b is able to provide an effective detection 51b of this edge 21.

Detections 51a and 51b are qualitatively assessed by assessment modules 6a and 6b. Assessments 61a and 61b are provided as feedback to inputs 32a and 32b of preprocessing module 3. In this manner, preprocessing module 3 is able to adapt the parameters of internal processing chain 31 thereof in a way that allows both analysis modules 5a and 5b to each provide optimal detections 51a and 51b, respectively.

Assessment modules 6a and 6b can also be optionally combined in one single assessment module 6 that feeds back an assessment 61, composed of assessments 61a and 61b, for example, combined by weighting, to an input 32 of preprocessing module 3. For the sake of clarity, this case is not sketched in FIG. 1.

Preprocessing module 3 also determines a controlled variable 71 for an operating parameter 72 of camera 7. In this manner, the requirements of analysis modules 5a and 5b can be considered already upon recording of input image 2. For example, the light exposure can be adapted.

In an especially advantageous example embodiment of the present invention, detection 51a and/or detection 51b are/is converted into a control signal that, in turn, is fed to a steering system, a braking system, and/or a drive system of an at least partially automated vehicle, in order to manage the driving task.

Figure 2:
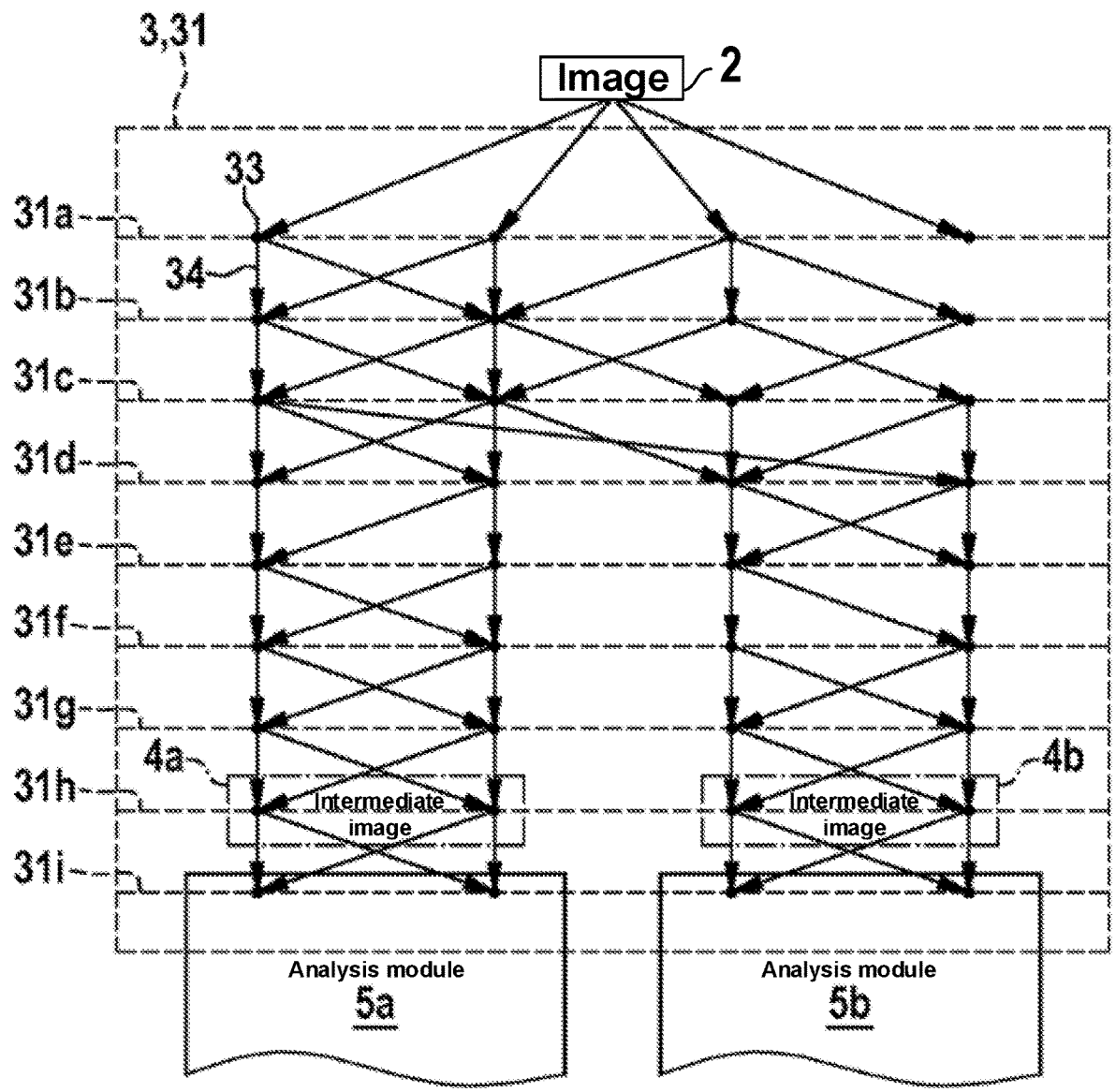
FIG. 2 shows an exemplary design of the parameterized internal processing chain in a preprocessing module according to an example embodiment of the present invention.

An exemplary design of internal processing chain 31 is sketched in FIG. 2. Internal processing chain 31 is an artificial neural network of nine layers 31a-31i having neurons 3, drawn here exemplarily. Among neurons of adjacent layers 31a-31i are connections 34 whose weights form the parameters of internal processing chain 31. For the sake of clarity, only one neuron is denoted by reference numeral 33 and only one connection by reference numeral 34 in FIG. 2.

Layer 31a is the input layer that records input image 2. They are followed from top to bottom by processing layers 31b-31g. At the transition from second processing layer 31c to third processing layer 31d, the processing splits into two branches that, at intermediate image layer 31h, ultimately lead to the two intermediate images 4a and 4b. Intermediate images 4a and 4b are intended for analysis modules 5a and 5b.

Underneath intermediate image layer 31h, thus on the side thereof facing away from input layer 31a, processing chain 31 includes an analysis layer, in which is implemented a part of the functionality of the two analysis modules 5a and 5b. In this manner, the most computationally intensive steps of the respective analysis can still take place in preprocessing module 3, where parallel computing capacity is available on a massive scale at low cost.

Figure 3:
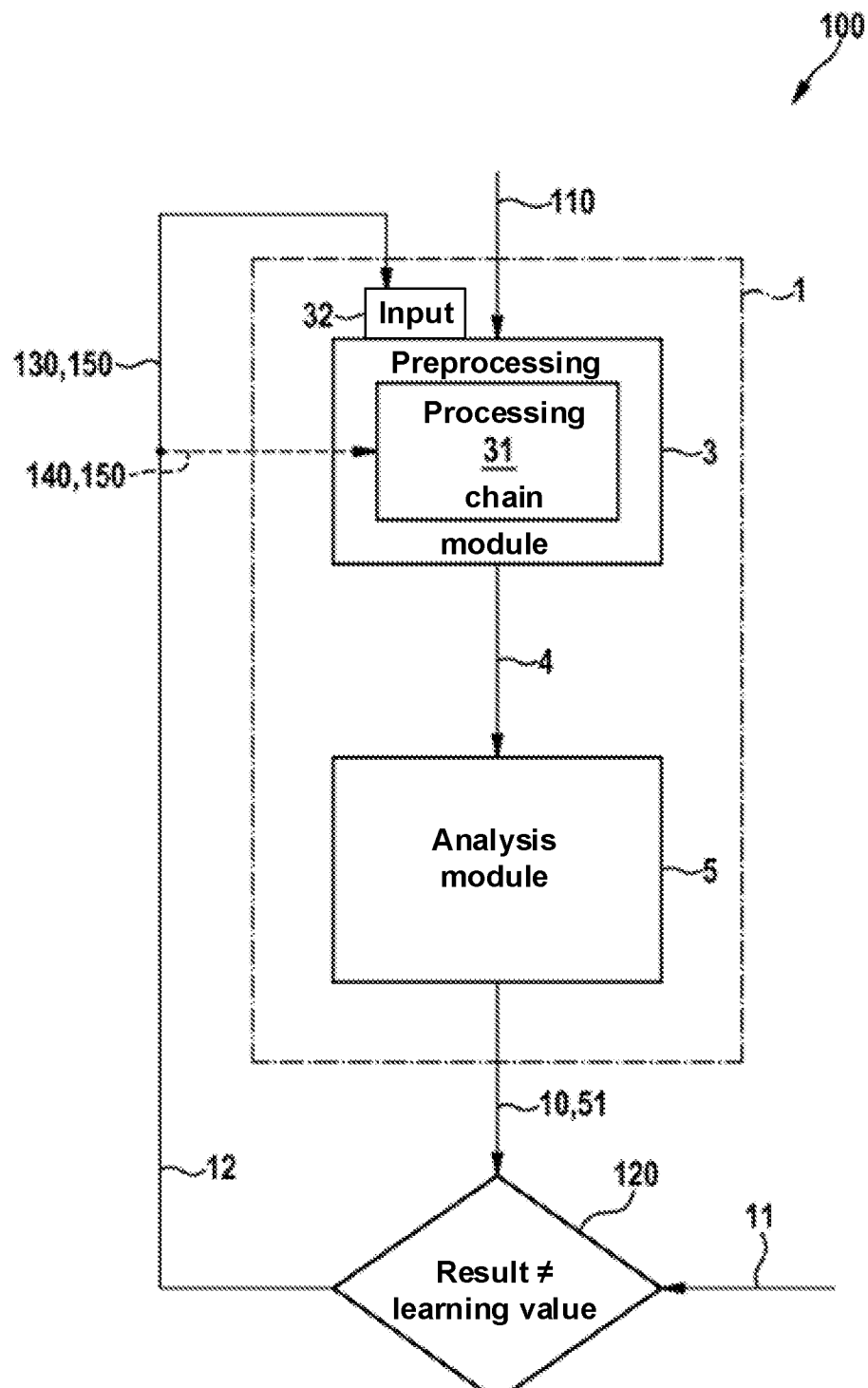
FIG. 3 shows illustrates a method for training a system, according to an example embodiment of the present invention.

FIG. 3 shows an example embodiment of method 100 for training system 1. In step 110, a multiplicity of learning input images 9 are fed to preprocessing module 3. Preprocessing module 3 produces an intermediate image 4 therefrom that is fed to analysis module 5. In step 120, result 10 provided by analysis module 5 is compared to learning value 11 for result 10. In step 130, determined difference 12 is fed back to an input 32 of preprocessing module 3 so that the self-learning process thereof is able to adapt the parameters of internal processing chain 31 in a way that ultimately reduces deviation 12 in accordance with step 150. Alternatively, or also in combination therewith, the parameters of internal processing chain 31 can be directly adapted in accordance with step 140. In this case, for example, an external computing capacity can be used that is considerably greater than that which is physically installed in supplied system 1.

What is claimed is:

1. A system comprising:
    at least one artificial intelligence preprocessing module that includes a parameterized internal processing chain including at least one artificial neural network composed of a plurality of layers of artificial neurons that are configured to generate at least one intermediate image from an input image; and
    a plurality of analysis modules;
    wherein:
        the plurality of layer include an input layer, an intermediate image layer, and at least two processing layers between the input and intermediate image layers;
        the input layer is configured to record the input image;
        the intermediate image layer is configured to store the intermediate image;
        parameters of the processing chain includes weights of connections between the plurality of layers of the neural network; and
        at least one of the plurality of analysis modules is configured to detect at least one object in the at least one intermediate image while at least one other of the plurality of analysis modules is configured to detect at least one edge in the at least one intermediate image.

2. The system of claim 1, further comprising at least one assessment module, wherein the at least one assessment module is configured to qualitatively assess, and feed back as an input to the preprocessing module, respective results provided by the analysis modules.

3. The system of claim 2, wherein the assessment module is configured to combine the assessments of the respective results provided by the plurality of analysis modules into an overall assessment and feed the overall assessment back as input to the preprocessing module.

4. The system of claim 3, wherein, in the preprocessing module, the input image passes through one and the same internal processing chain during generation of a plurality of instances of the intermediate image respectively for the plurality of analysis modules.

5. The system of claim 1, wherein at least one of the layers is configured to convolve image data using a convolution kernel, and/or compress the image data by downsampling.

6. The system of claim 1, wherein the plurality of layers include, on a side of the processing chain opposite of the input layer, at least one analysis layer in which at least a part of a functionality of the analysis modules is implemented.

7. The system of claim 1, further comprising a camera by which the input image is obtained.

8. The system of claim 7, wherein the camera is adapted to be cooled by a windshield of a vehicle, and the camera has an electric power consumption of maximally five watts and/or the preprocessing module is adapted for ascertaining at least one controlled variable that is fed to the camera for at least one operating parameter thereof.

9. The system of claim 1, wherein the system is coupled to, and is configured to convert at least one detection of the edge or object into a control signal that acts on, a steering system, a braking system, and/or a drive system of an at least partially automated vehicle.

10. The system of claim 1, wherein the artificial intelligence preprocessing module is a K1 preprocessing module.

11. A method for training a system that includes (a) at least one artificial intelligence preprocessing module that includes a parameterized internal processing chain including at least one artificial neural network composed of a plurality of layers of artificial neurons that are configured to generate at least one intermediate image from an input image, and (b) a plurality of analysis modules, wherein (1) the plurality of layer include an input layer, an intermediate image layer, and at least two processing layers between the input and intermediate image layers, (2) the input layer is configured to record the input image, (3) the intermediate image layer is configured to store the intermediate image, (4) parameters of the processing chain includes weights of connections between the plurality of layers of the neural network, and at least one of the plurality of analysis modules is configured to detect at least one object in the at least one intermediate image while at least one other of the plurality of analysis modules is configured to detect at least one edge in the at least one intermediate image, the method comprising:
    feeding a plurality of learning input images to the system;
    comparing results provided by the analysis modules for each of the learning input images to respective learning values; and
    feeding back a deviation provided by the comparing to an input of the preprocessing module and/or adapting the parameters of the processing chain to reduce the deviation.

12. The method of claim 11, wherein the method includes the adapting, and a gradient descent method is used for the adapting.

13. A non-transitory computer-readable medium on which are stored instructions that are exectutable by a computer and that, when executed by the computer, cause the computer to form a system that includes:
    at least one artificial intelligence preprocessing module that includes a parameterized internal processing chain including at least one artificial neural network composed of a plurality of layers of artificial neurons that are configured to generate at least one intermediate image from an input image; and
    a plurality of analysis modules;
    wherein:

the plurality of layer include an input layer, an intermediate image layer, and at least two processing layers between the input and intermediate image layers;

the input layer is configured to record the input image;

the intermediate image layer is configured to store the intermediate image;

parameters of the processing chain includes weights of connections between the plurality of layers of the neural network; and at least one of the plurality of analysis modules is configured to detect at least one object in the at least one intermediate image while at least one other of the plurality of analysis modules is configured to detect at least one edge in the at least one intermediate image.

14. A non-transitory computer-readable medium on which are stored instructions that are executable by a processor and that, when executed by the processor, cause the processor to perform a method that trains a system that includes (a) at least one artificial intelligence preprocessing module that includes a parameterized internal processing chain including at least one artificial neural network composed of a plurality of layers of artificial neurons that are configured to generate at least one intermediate image from an input image, and (b) a plurality of analysis modules, wherein (1) the plurality of layer include an input layer, an intermediate image layer, and at least two processing layers between the input and intermediate image layers, (2) the input layer is configured to record the input image, (3) the intermediate image layer is configured to store the intermediate image, (4) parameters of the processing chain includes weights of connections between the plurality of layers of the neural network, and at least one of the plurality of analysis modules is configured to detect at least one object in the at least one intermediate image while at least one other of the plurality of analysis modules is configured to detect at least one edge in the at least one intermediate image, the method comprising:

feeding a plurality of learning input images to the system;

comparing results provided by the analysis modules for each of the learning input images to respective learning values; and feeding back a deviation provided by the comparing to an input of the preprocessing module and/or adapting the parameters of the processing chain to reduce the deviation.

* * * * *